(12) United States Patent
Hinds

(10) Patent No.: US 8,935,741 B2
(45) Date of Patent: Jan. 13, 2015

(54) POLICY ENFORCEMENT IN MOBILE DEVICES

(75) Inventor: Donald W. Hinds, Alpharetta, GA (US)

(73) Assignee: iAnywhere Solutions, Inc, Dublin, CA (US)

( * ) Notice: Subject to any disclaimer, the term of this patent is extended or adjusted under 35 U.S.C. 154(b) by 649 days.

(21) Appl. No.: 12/105,003

(22) Filed: Apr. 17, 2008

(65) Prior Publication Data

US 2009/0265754 A1    Oct. 22, 2009

(51) Int. Cl.
*G06F 21/00*    (2013.01)
*G06F 21/62*    (2013.01)

(52) U.S. Cl.
CPC .... *G06F 21/6218* (2013.01); *G06F 2221/2149* (2013.01)
USPC ............ 726/1; 726/2; 726/4; 726/22; 726/27; 726/28; 726/29; 726/30; 713/150; 713/153

(58) Field of Classification Search
USPC ........ 726/1, 2, 4, 22, 27–30; 455/432.1, 54.1, 455/54.2; 713/150, 153
See application file for complete search history.

(56) References Cited

U.S. PATENT DOCUMENTS

| | | | |
|---|---|---|---|
| 7,415,439 B2 * | 8/2008 | Kontio et al. .................... | 705/53 |
| 7,665,118 B2 * | 2/2010 | Mann et al. ........................ | 726/1 |
| 2005/0149726 A1 * | 7/2005 | Joshi et al. ..................... | 713/164 |
| 2006/0050686 A1 * | 3/2006 | Velez-Rivera et al. ........ | 370/352 |
| 2007/0266422 A1 * | 11/2007 | Germano et al. ................. | 726/1 |

OTHER PUBLICATIONS

Mukkamala, R., Chkuri, L., Moharrum, M., and Palley, S., "Policy-Based Security Management for Enterprise Systems," Research Directions in Data and Applications Security XVIII, IFIP International Federation for Information Processing, Springer Boston, vol. 144, pp. 219-233, 2004.*
Bishop, M., "Section 29.5.5: Improper Deallocation and Deletion," Computer Security: Art and Science, Addison-Wesley, 2003.*

* cited by examiner

*Primary Examiner* — Mohammad A Siddiqi
(74) *Attorney, Agent, or Firm* — Sterne, Kessler, Goldstein & Fox P.L.L.C.

(57) ABSTRACT

Systems, methods and computer program products for enabling enforcement of an administrative policy on one or more mobile devices are described herein. In an embodiment, an administrator uses a policy server to create and provide an enforcement policy to a mobile device. An enforcement policy may include information on mobile device resources which may be controlled by an administrator. An enforcement policy also includes information on how mobile device features will be set, configured or disabled. An enforcement device driver and an enforcement monitor on a mobile device use the enforcement policy to control access to resources associated with the mobile device regardless of whether the mobile device is "online" and connected to a network or "offline" and disconnected from a network.

17 Claims, 8 Drawing Sheets

POLICY ENFORCEMENT IN MOBILE DEVICES

BACKGROUND

1. Field of the Invention

The present invention relates generally to mobile technology, and more particularly to the enforcement of an administrative policy on a mobile device.

2. Related Art

A variety of mobile devices (such as personal data assistants, or PDAs, handheld computers, cellular phones, pagers, etc.) exist. Such mobile devices include ones based on the PALM operating environment and the WINDOWS CE operating environment.

Mobile devices are being increasingly used across organizations where several employees are provided with mobile devices which enable them to communicate with their respective organizations or access sources of information.

Each user of a mobile device may have a different purpose of use or a different pattern of use relative to other users. For example, one user may need only email access while another user may need both Internet and email access. Furthermore, it may be the policy of an organization, for example, to allow employees Internet access but block them from accessing certain web sites on the Internet. Other policies may also include selective access to organizational resources or blocking users from using certain applications on their mobile devices (such as camera, BLUETOOTH, etc.) It may also be necessary to prevent users from modifying policies set by an administrator of a network even when a mobile device is offline or disconnected from the network.

Therefore, what is needed is a system, method and computer program product that enables enforcement of an administrative policy deployed by an administrator on a mobile device.

BRIEF SUMMARY

Briefly stated, the invention includes system, method, computer program product embodiments and combinations and sub-combinations thereof for enabling enforcement of an administrative policy on one or more mobile devices. In an embodiment, an administrator uses a policy server to create and provide an enforcement policy to a mobile device. The enforcement policy may include information on mobile device resources which may be controlled by an administrator and resources to which a user may or may not have access. The enforcement policy may also include information on how mobile device features may be set, configured or disabled.

An enforcement device driver and an enforcement monitor in a mobile device use the enforcement policy to control access to resources associated with the mobile device regardless of whether the mobile device is "online" and connected to a network or "offline" and disconnected from a network.

In this way, an administrator may control mobile device resources available to a user.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
FIG. 1 is an architecture diagram of a system to enable deployment of an enforcement policy, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to systems, methods and computer program products for enabling enforcement of an administrative policy on a single or a fleet of mobile devices. In an embodiment, an administrator uses a policy server to create an enforcement policy. An enforcement policy may include information on mobile device resources which may be controlled by an administrator and resources to which a user may or may not have access. An enforcement policy also includes information on how mobile device features may be set, configured or disabled.

An enforcement device driver and an enforcement monitor in a mobile device use the enforcement policy to control access to resources associated with the mobile device regardless of whether the mobile device is "online" and connected to a network or "offline" and disconnected from a network.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

FIG. 1 illustrates a general system architecture for enabling deployment of an enforcement policy on one or more mobile devices, according to an embodiment of the invention. (While the following is described in terms of mobile devices, the invention is not limited to this embodiment. The invention is applicable to any system having generally the structure of FIG. 1, or that would benefit from the functions as described herein.)

Network 110 can be any type of network or combination of networks such as, but not limited to, a local area network, wide area network or the Internet. Network 110 may be a form of a wired network or a wireless network, or a combination thereof. Network 110 may allow policy server 130 and mobile device 120 to communicate with each other.

Mobile device 120 can include, but is not limited to, a device having a processor (or state machine) and memory for executing and storing instructions. Mobile device 120 includes, but is not limited to, PDAs, cell phones, game devices, music devices, portable multimedia devices etc. (While a single mobile device 120 is shown in FIG. 1, in practice the invention operates with any number of mobile devices.) Such a mobile device may include software, firmware, and hardware or some combination thereof. The software may include one or more applications and an operating system. The hardware can include, but is not limited to, a processor, memory and user interface display. An optional input device, such as a mouse, stylus or any other pointing device, may be used. An exemplary architecture of mobile device 120 according to an embodiment of the invention is described below in further detail.

Policy server 130 allows administrator 102 to create an enforcement policy according to an embodiment of the invention. Policy server 130 has the ability to communicate over network 110. As an example, policy server 130 may provide an enforcement policy to mobile device 120 over network 110. In an embodiment, policy server may encrypt an enforcement policy using any well known encryption technique or technology before it is provided to mobile device 120 over network 110.

Mobile Device

Figure 2:
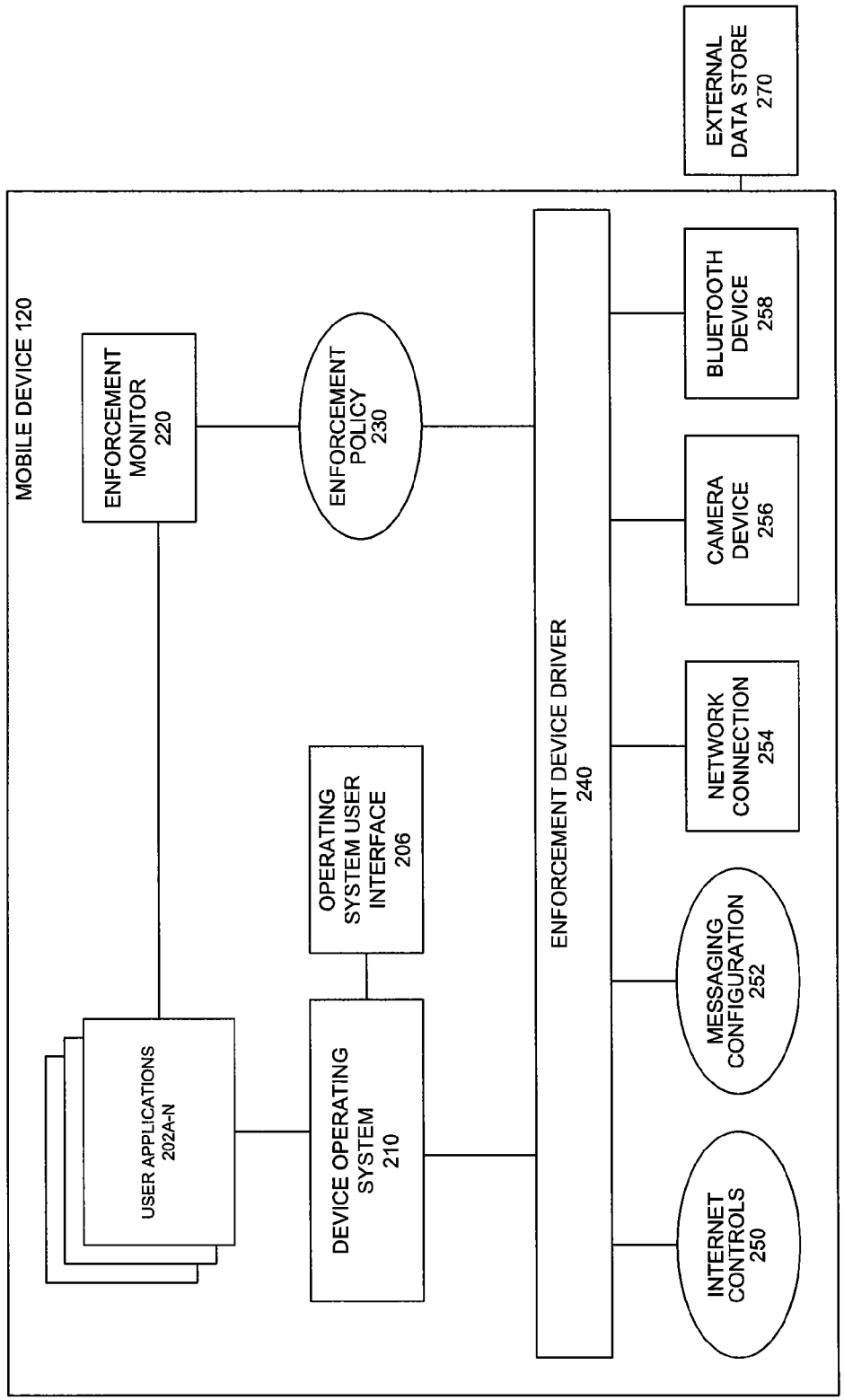
FIG. 2 is an architecture diagram of a mobile device, according to an embodiment of the invention.

FIG. 2 is an architecture diagram of a mobile device 120 according to an embodiment of the invention.

Mobile device 120 includes enforcement monitor 220, enforcement policy 230, enforcement device driver 240, device operating system 210, user application(s) 202A-N, and operating system interface 206. Mobile device 120 may further include internet controls 250, messaging configuration 252, network connection 254, camera device 256, Bluetooth device 258 and external data store 270 which may be connected to mobile device 120. Mobile device 120 can include other functional modules, and/or combinations or sub-combinations of the modules described herein.

Mobile device 120 may receive enforcement policy 230 from policy server 130 over network 110. Enforcement policy 230 could also be pre-installed, manually installed or installed through any other method. As an example, not intended to limit the invention, mobile device 120 may receive enforcement policy 230 from policy server through a message transmitted using the short messaging service (SMS). SMS is known to persons skilled in the art as a method to transmit short messages to mobile devices across wireless networks.

User application(s) 202A-N may be any type of applications that can be instantiated on mobile device 120 by user 150. Such an application includes, but is not limited to, a word processing application, a spread sheet application, a mail application, a financial application, a browser and forms of voice, video and multimedia applications or any other application that makes use of data.

Device operating system 210 may be any operating system that may be used for operation of mobile device 120. As an example, but without limitation, device operating system 210 may be the Palm or the Windows CE operating system, or an operating system based on Linux. These examples are illustrative and are not intended to limit the invention. User 150 may interact with device operating system 210 using operating system user interface 206.

Enforcement policy 230 may include information regarding resources on a mobile device that can be controlled by administrator 102. Furthermore, enforcement policy 230 may describe how features of mobile device 120 may be set, configured or disabled. Exemplary resources or features that may be controlled by enforcement policy 230, include, but are not limited to:

1. Cellular Network Connections
2. Internet Connections and Security Configuration
3. Infrared Ports
4. WIFI Connections
5. Microphones
6. Device Cameras
7. Device Memory Expansion Slots
5. Device USB Connectivity
9. Device Bluetooth Connectivity
10. Owner Information for Device
11. Email and Text Messaging Configuration Additionally, enforcement policy 230 may control or enforce internet controls 250, messaging configuration 252, network connection 254, camera device 256, Bluetooth device 258 and external data store 270.

Internet controls 250 may include controls which may regulate access to certain sites on the Internet or control a manner in which mobile device 120 connects to the Internet or other networks.

Messaging configuration 252 may include information on how messages are transmitted and received by mobile device 120. For example, messaging configuration 252 may prevent user 150 from sending messages to a certain group of users associated with network 110.

Network connection 254 may include one or more connections used by mobile device 120 to access network 110. Enforcement policy 230, for example, may prevent user 150 from accessing network 110 by controlling or restricting access to network connection 254.

Camera device 256 may include any device used to obtain digital images. Enforcement policy 230 may be configured in a way as to prevent or allow user 150 from using camera device 256.

Bluetooth device 258 may include any device used to transmit or receive data using the Bluetooth protocol. Bluetooth is known to persons skilled in the art as a wireless protocol used to connect devices over a short range.

Enforcement policy 230 may control other functions and capabilities of mobile device 120, and the extent of such control is limited only by such functionality and capability of the mobile device 120.

In an embodiment, enforcement policy 230 is stored in an encrypted state on mobile device 120. As an example, policy server 130 may encrypt enforcement policy 230 created by administrator 102 before it is provided to mobile device 120. Encryption of enforcement policy 230 may prevent user 150 from modifying enforcement policy 230.

In an embodiment, not intended to limit the invention, enforcement policy 230 is encrypted using FIPS 140-2 compliant encryption. FIPS 140-2 is known to persons skilled in the art and is a U.S. government computer security standard used to accredit cryptographic modules. Some of the cryptographic algorithms used are triple DES (3DES) and advanced encryption standard (AES). However, the invention could alternatively employ any well known encryption algorithm process or technique.

Enforcement Device Driver

Enforcement device driver 240 intercepts requests for resources made by user 150 and/or user application(s) 202A-N and checks encrypted enforcement policy 230 to authorize or deny such requests. In an example, enforcement device driver 240 may restrict user 150 from taking photographs using camera device 256 by preventing requests from user 150 from being passed onto camera device 256.

Figure 3:
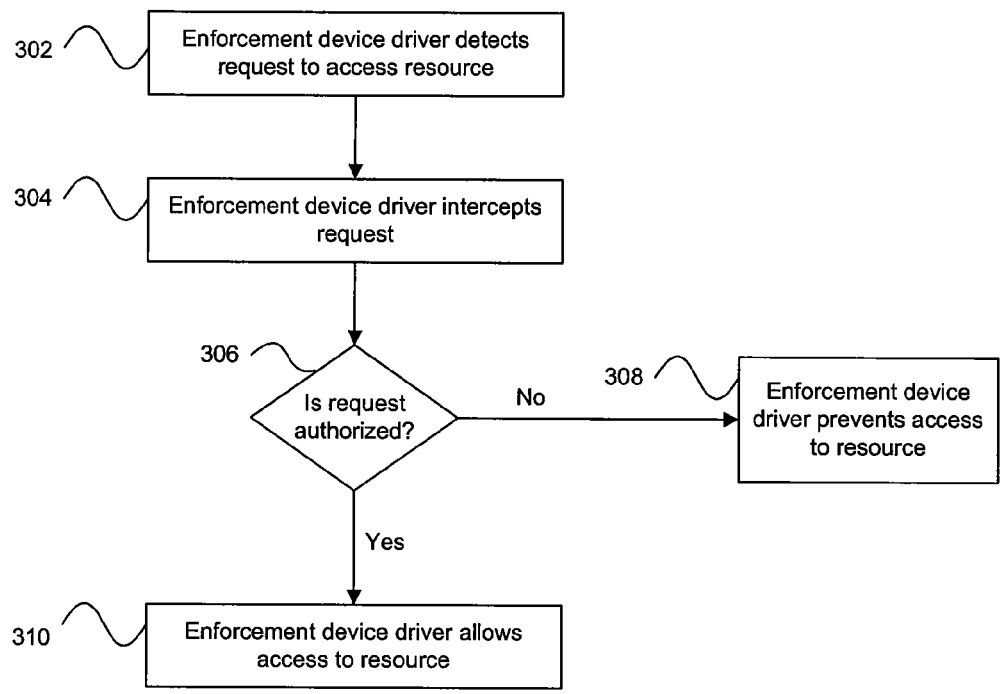
FIG. 3 is a flowchart illustrating processing of a request to access mobile device resources, according to an embodiment of the invention.

Operation of enforcement device driver 240 according to an embodiment of the invention will now be described in detail with reference to flowchart 300 in FIG. 3.

In step 302, enforcement device driver 240 detects a request to access a resource associated with mobile device 120. As an example, a resource may include network connection 254 or camera device 256.

In step 304, enforcement device driver 240 intercepts the request detected in step 302.

In step 306, enforcement device driver 240 checks whether the request detected in step 302 is authorized based on enforcement policy 230. If the request is authorized, step 310 is performed. If the request is not authorized, step 308 is performed.

In step 310, enforcement device driver 240 allows user 150 or application 202 to access a resource per the request detected in step 302.

Returning to step 306, if the request is not authorized, step 308 is performed and enforcement device driver 230 prevents user 150 or application 202 from accessing the requested resource.

In this way, enforcement device driver 240 controls access to resources of mobile device 120 based on enforcement policy 230.

Enforcement Monitor

Enforcement monitor 220 monitors user applications 202A-N and any other operation that may be automatically invoked or instantiated by user 150. In an embodiment, enforcement monitor 220 may prevent user 150 from running applications which are "black-listed" or blocked by administrator 102. For example, enforcement monitor 220 may prevent user 150 from running gaming applications on mobile device 120.

In an embodiment, enforcement monitor 220 actively monitors settings associated with resources that are enforced by enforcement policy 230. If enforcement monitor 220 detects a change in the settings, enforcement monitor 220 may re-apply settings that are included in enforcement policy 230. Enforcement monitor 220 monitors enforcement policy 230 regardless of whether mobile device 220 is "online" and connected to network 110 or "offline" and disconnected from network 110.

Figure 4:
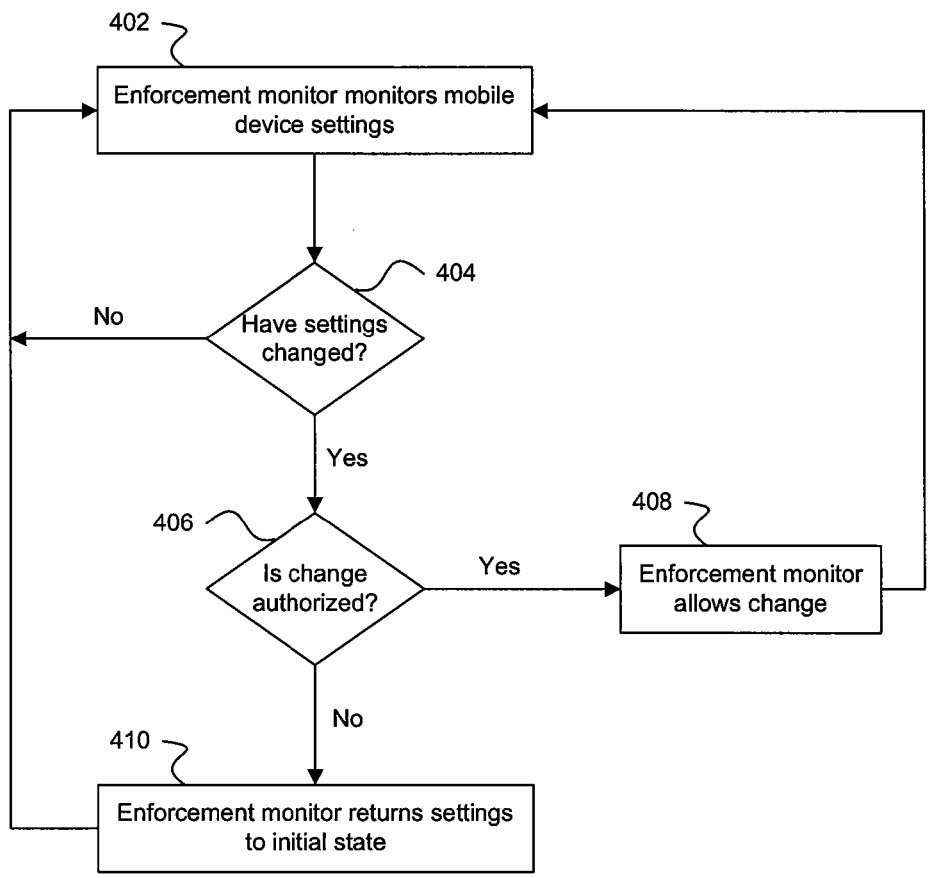
FIG. 4 is a flowchart illustrating operation of an enforcement monitor, according to an embodiment of the invention.

Operation of enforcement monitor 220 according to an embodiment of the invention will now be described in detail with reference to flowchart 400 in FIG. 4.

In step 402, enforcement monitor 220 begins monitoring resources associated with mobile device 120. For example, enforcement monitor 220 may monitor user application(s) 202A-N instantiated by user 150 when mobile device 120 is powered on.

In step 404, enforcement monitor 220 checks if settings enforced by enforcement policy 230 have changed. If settings have not changed, method 400 returns to step 402. If settings enforced by enforcement policy 230 have changed, step 406 is performed.

In step 406, enforcement monitor 220 checks if the change in settings is authorized. For example, enforcement monitor 220 may read enforcement policy 230 to check if the change in settings is authorized. If the change in settings is not authorized, step 410 is performed. If a change in settings is authorized, step 408 is performed.

In step 408, enforcement monitor 220 allows the change in settings and method 400 proceeds to step 402.

Returning to step 406, if the change was not authorized, enforcement monitor 220 in step 410 returns the settings to a state determined by enforcement policy 230 or a state desired by administrator 103 and method 400 proceeds to step 402.

In this way, enforcement monitor 220 monitors and enforces settings associated with mobile device 120 regardless of whether mobile device 120 is "offline" or "online".

Encryption and Decryption of Enforcement Policy

In an embodiment, enforcement policy 230 stored in an encrypted form is decrypted when it is read by enforcement device driver 240 or enforcement monitor 220. Enforcement policy 230 is then stored back in an encrypted form on mobile device 120 in real time without any separate input from user 150 or user application(s) 202A-N.

Figure 5:
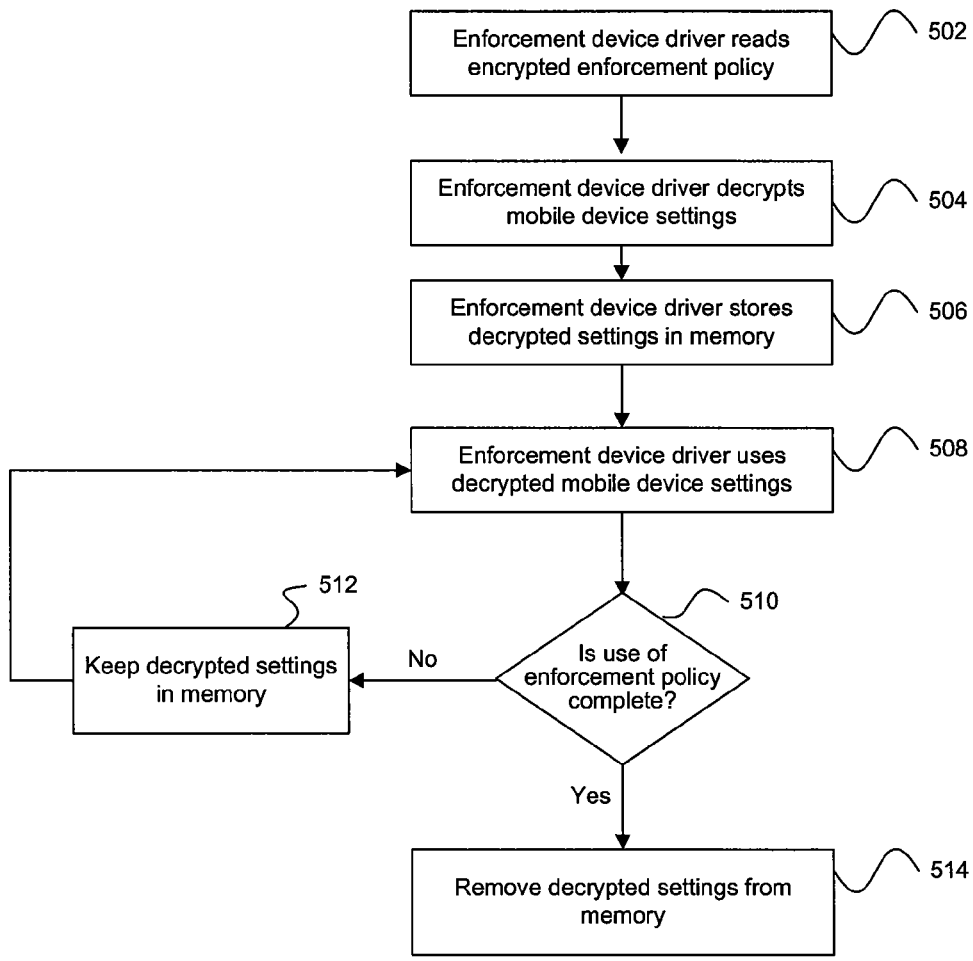
FIG. 5 is a flowchart illustrating decryption and encryption of mobile device settings, according to an embodiment of the invention.

A process illustrating real time encryption and decryption of enforcement policy 230 according to an embodiment of the invention will now be described in detail with reference to flowchart 500 in FIG. 5.

In step 502, enforcement device driver 240 reads encrypted enforcement policy 230. Enforcement policy 230 may be read, for example, when user 150 is requesting access to a resource associated with mobile device 120.

In step 504, enforcement device driver 240 decrypts mobile device settings included in encrypted enforcement policy 230. As an example, such settings may be set by an administrator 102 to control access to resources associated with mobile device 102.

In step 506, enforcement device driver 240 stores decrypted mobile device settings in memory associated with mobile device 120.

In step 508, enforcement device driver 240 uses decrypted mobile device settings in enforcement policy 230.

In step 510, enforcement device driver 240 checks if the use of enforcement policy 230 is complete. If the use of enforcement policy 230 is complete, step 514 is performed. If the use of enforcement policy 230 is not complete, step 512 is performed.

In step 512, decrypted settings associated with enforcement policy 230 are kept in memory of mobile device 120 and method 500 proceeds to step 506.

Returning to step 510, if the use of enforcement policy 230 is complete, the decrypted settings are removed from memory in step 514.

In this way, enforcement policy 230 and any settings associated with enforcement policy 230 are encrypted and decrypted in real time without any input from user 150. It is noted that the invention may be used with any well known encryption and decryption technique and algorithms.

Exemplary Control of Bluetooth Device

In some cases, administrator 102 configure enforcement policy 230 in a manner that allows use of Bluetooth device 258 for voice communication but blocks any form of data transfer over Bluetooth device 258 by user 150.

Figure 6:
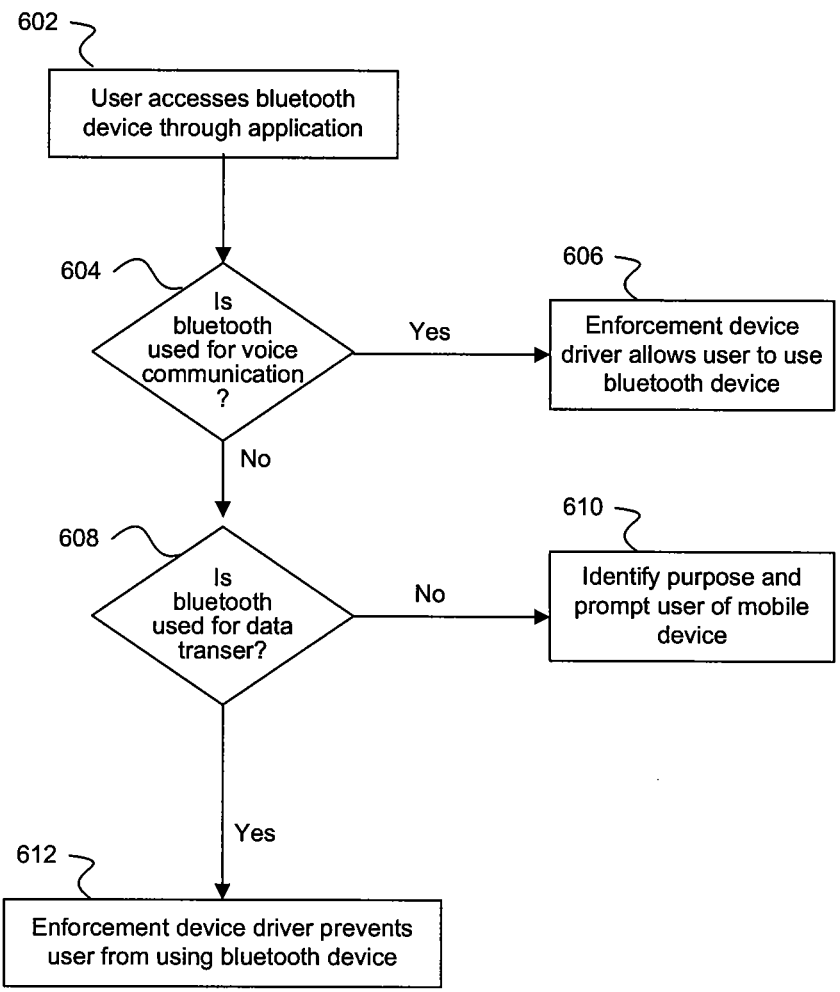
FIG. 6 is a flowchart illustrating exemplary processing of a request to access a Bluetooth device according to an embodiment of the invention.

An exemplary process illustrating control of Bluetooth device 258, according to an embodiment of the invention will now be described in detail with reference to flowchart 600 in FIG. 6.

In step 602, user 150 accesses Bluetooth device 258 through user application(s) 220A-N.

In step 604, enforcement device driver 240 checks if Bluetooth device 258 is intended to be used for voice communication. If Bluetooth device 258 is to be used for voice communication step 606 is performed. If Bluetooth device 258 is not to be used for voice communication, step 608 is performed.

In step 606, enforcement device driver 240 allows user 150 to proceed with use of Bluetooth device 258.

Returning to step 606, if the device is not to be used for voice communication, enforcement device driver 240 checks if Bluetooth device 258 is used for data transfer in step 608. If Bluetooth device 258 is not used for data transfer, step 610 is performed. If Bluetooth device 258 is used for data transfer, step 612 is performed.

In step 610, enforcement device driver 240 identifies purpose of use of mobile device 240 and prompts user 150. As an example, user 150 may be prompted to provide additional input to mobile device 120 regarding the user 150's intended use of the Bluetooth functionality.

Returning to step 608, if Bluetooth device 258 is to be used for data transfer, step 612 is performed, wherein enforcement device driver 240 prevents user 150 from using Bluetooth device 258 for data transfer.

In this way, enforcement device driver 240 allows user 150 to use Bluetooth device 258 for voice communication, but blocks user 150 from using Bluetooth device 258 for data transfer.

It is noted that such enforcement policy for Bluetooth functionality is provided herein for illustrative purposes only and is not limiting. Other embodiments may employ different Bluetooth enforcement policies.

Exemplary Control of External Data Store

In some cases, administrator 102 may configure enforcement policy 230 to prevent use of external data store 270 by user 150. This may be necessary to prevent private or confidential data from being copied onto external data store 270 from mobile device 120.

Figure 7:
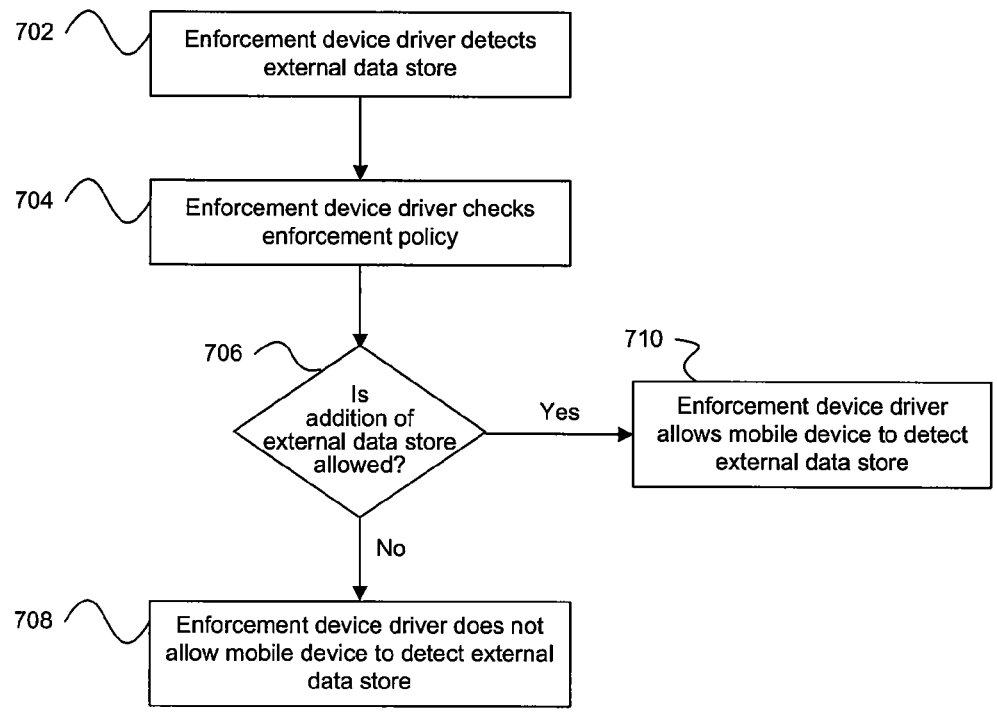
FIG. 7 is a flowchart illustrating detection of an external data store based on an enforcement policy, according to an embodiment of the invention.

A process illustrating control of external data store 270 according to an embodiment of the invention will now be described in detail with reference to flowchart 700 in FIG. 7.

In step 702, enforcement device driver 240 detects external data store 270. As an example, external data store 270 may be detected when user 150 inserts an external data store such as an SD card into mobile device 120.

In step 704, enforcement device driver checks if use of external data store 270 is allowed by enforcement policy 230. If the use of external data store is allowed by enforcement policy 230, step 710 is performed, wherein enforcement device driver 240 allows mobile device 120 to use external data store 270. For example, user 150 may be able to access data stored in external data store 270 using mobile device 120.

Returning to step 706, if addition of external data store is not allowed by enforcement policy 230, then step 708 is performed and enforcement device driver 240 does not allow mobile device 120 to use external data store 270.

It is noted that such enforcement policy for external data store functionality is provided herein for illustrative purposes only and is not limiting. Other embodiments may employ different external data store enforcement policies.

Example Computer Embodiment

Figure 8:
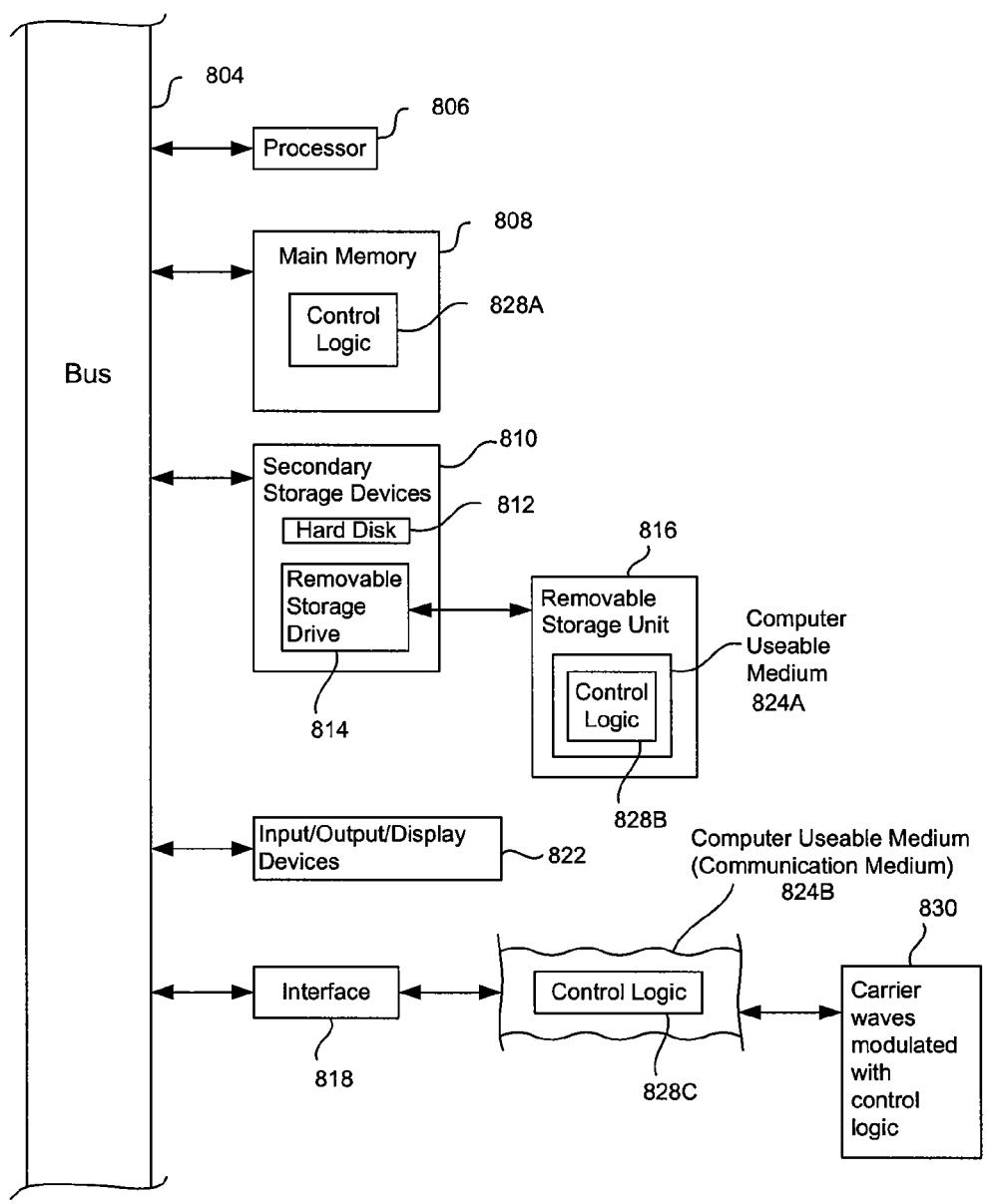
FIG. 8 illustrates an example computer useful for implementing components of the invention.

In an embodiment of the present invention, the system and components of embodiments described herein are implemented using well known computers, such as computer 802 shown in FIG. 8. For example, policy server 130 or mobile device 120 can be implemented using computer(s) 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of controlling access to a resource in a mobile device, comprising:
   intercepting a request to access said resource;
   determining a type of intended operation of a resource functionality based on said request, wherein said type of intended operation corresponds to a user's purpose of intended use associated with a communication type of said mobile device;
   selectively authorizing access to said resource according to said determined type of intended operation based on an encrypted enforcement policy stored in said mobile device, wherein said selectively authorizing comprises granting access to said resource when said intended operation utilizes resource functionality of a first communication type, and denying access to said resource when said intended operation utilizes resource functionality of a second communication type;
   applying said encrypted enforcement policy;
   monitoring one or more settings associated with said resource when said mobile device is offline;
   detecting a change in said one or more settings, wherein said one or more settings are enforced by said encrypted enforcement policy;
   determining whether said change in said one or more settings is authorized by said encrypted enforcement policy; and
   restoring said one or more settings to a state based on determining that said change is not authorized, wherein said state is based on said encrypted enforcement policy.

2. The method of claim 1, further comprising:
   decrypting said enforcement policy to obtain a decrypted enforcement policy;
   storing said decrypted enforcement policy in memory; and
   using said decrypted enforcement policy to control access to said resource;
   wherein said decrypted enforcement policy is removed from memory after said using step is completed.

3. The method of claim 1, further comprising:
   receiving said encrypted enforcement policy over a short messaging service (SMS) channel.

4. The method of claim 1, further comprising:
   instantiating an enforcement device driver to intercept said request.

5. The method of claim 1, wherein determining said type of said intended operation includes consideration to a user-supplied intended operation in response to prompting.

6. The method of claim 1, wherein selectively authorizing comprises either:
   granting access to said resource when said intended operation utilizes resource functionality of a voice communication type, and denying access to said resource when said intended operation utilizes resource functionality of a data communication type, or
   granting access to said resource when said intended operation utilizes resource functionality of a data communication type, and denying access to said resource when said intended operation utilizes resource functionality of a voice communication type.

7. A method of controlling resources in a mobile device, comprising:
   determining a type of intended operation of a resource functionality based on said request, wherein said type of intended operation corresponds to a user's purpose of intended use associated with a communication type of said mobile device;
   selectively authorizing access to said resource according to aid determined type of intended operation based on an encrypted enforcement policy stored in said mobile device, wherein said selectively authorizing comprises granting access to said resource when said intended operation utilizes resource functionality of a first communication type, and denying access to said resource when said intended operation utilizes resource functionality of a second communication type;
   applying said encrypted enforcement policy;
   monitoring one or more settings associated with said resource when said mobile device is offline:
   detecting a presence of an external data store;
   determining whether an addition of said external data store is authorized by said enforcement policy; and
   restoring said one or more settings to a state based on determining that said addition is not authorized, wherein said state is based on said enforcement policy.

8. The method of claim 7, further comprising:
   instantiating an enforcement monitor to monitor said one or more settings.

9. A processor-based system for controlling access to resources in a mobile device, comprising:
   one or more computer processors;
   a first module configured to intercept a request to access said resource;
   a second module configured to determine a type of intended operation of a resource functionality based on said request, wherein said type of intended operation corresponds to a user's purpose of intended use associated with a communication type of said mobile device;
   a third module configured to selectively authorize access to said resource according to said determined type of intended operation based on an encrypted enforcement policy stored in said mobile device, wherein said selectively authorizing comprises granting access to said resource when said intended operation utilizes resource functionality of a first communication type, and denying access to said resource when said intended operation utilizes resource functionality of a second communication type; and a fourth module configured to:
monitor one or more settings associated with said resource when said mobile device is offline,
detect a change in said one or more settings, wherein said one or more settings are enforced by said encrypted enforcement policy,
determine whether said change in said one or more settings is authorized by said encrypted enforcement policy, and
restore said one or more settings to a desired state, wherein said desired state is based on said encrypted enforcement policy,
wherein said first module, said second module, said third module and said fourth module are implemented using said one or more computer processors.

10. The system of claim 9, further comprising:
a fifth module configured to decrypt said encrypted enforcement policy to obtain a decrypted enforcement policy;
a sixth module configured to store said decrypted enforcement policy in memory; and
a seventh module configured to control access to said resource using said decrypted enforcement policy, wherein said fifth module, said sixth module, and said seventh module are implemented using said one or more computer processors.

11. The system of claim 9, further comprising:
a fifth module configured to receive said encrypted enforcement policy over a short messaging service (SMS) channel, wherein said fifth module is implemented using said one or more computer processors.

12. The system of claim 9, further comprising:
a fifth module configured to instantiate an enforcement device driver to intercept said request, wherein said fifth module is implemented using said one or more computer processors.

13. The system of claim 9, further comprising:
a eighth module configured to instantiate an enforcement monitor to monitor said settings, wherein said eighth module is implemented using said one or more computer processors.

14. A computer program product including a non-transitory computer-readable medium having instructions stored thereon that, if executed by a processing device, cause the processing device to perform operations comprising:
intercepting a request to access said resource;
determining a type of intended operation of a resource functionality based on said request, wherein said type of intended operation corresponds to a user's purpose of intended use associated with a communication type of said mobile device;
selectively authorizing access to said resource according to said determined type of intended operation based on an encrypted enforcement policy stored in said mobile device, wherein said selectively authorizing comprises granting access to said resource when said intended operation utilizes resource functionality of a first communication type, and denying access to said resource when said intended operation utilizes resource functionality of a second communication type;
applying said encrypted enforcement policy;
monitoring one or more settings associated with said resource when said mobile device is offline;
detecting a change in said one or more settings, wherein said one or more settings are enforced by said encrypted enforcement policy;
determining whether said change in said one or more settings is authorized by said encrypted enforcement policy; and
restoring said one or more settings to a state based on determining that said change is not authorized, wherein said state is based on said encrypted enforcement policy.

15. The computer program product of claim 14, the operations further comprising:
decrypting said enforcement policy to obtain a decrypted enforcement policy;
storing said decrypted enforcement policy in memory; and
using said decrypted enforcement policy to control access to said resource.

16. The computer program product of claim 14, the operations further comprising:
receiving said encrypted enforcement policy over a short messaging service (SMS) channel.

17. The computer program product of claim 14, the operations further comprising:
instantiating an enforcement device driver to intercept said request.

* * * * *